(12) United States Patent
Stolov et al.

(10) Patent No.: US 8,872,788 B2
(45) Date of Patent: Oct. 28, 2014

(54) SYSTEMS AND METHODS FOR DETECTING MULTIPLE TOUCH POINTS IN SURFACE-CAPACITANCE TYPE TOUCH PANELS

(75) Inventors: Ilia Stolov, Holon (IL); Ziv Hershman, Givat Shmuel (IL)

(73) Assignee: Nuvoton Technology Corporation, Hsinchu Science Park (TW)

( * ) Notice: Subject to any disclaimer, the term of this patent is extended or adjusted under 35 U.S.C. 154(b) by 824 days.

(21) Appl. No.: 13/042,965

(22) Filed: Mar. 8, 2011

(65) Prior Publication Data

US 2011/0216038 A1   Sep. 8, 2011

Related U.S. Application Data

(60) Provisional application No. 61/311,440, filed on Mar. 8, 2010.

(51) Int. Cl.
*G06F 3/041* (2006.01)
*G06F 3/045* (2006.01)
*G06F 3/044* (2006.01)

(52) U.S. Cl.
CPC .................................... *G06F 3/044* (2013.01)
USPC ........................................... 345/174; 345/173

(58) Field of Classification Search
CPC ......... G06F 3/044; G06F 3/045; G06F 3/046; G06F 3/047; G06F 2203/04104
USPC ..................... 345/173–178; 178/18.01–20.04
See application file for complete search history.

(56) References Cited

U.S. PATENT DOCUMENTS

| 5,825,352 | A | 10/1998 | Bisset et al. |
| 6,188,391 | B1 | 2/2001 | Seely et al. |
| 6,222,528 | B1 * | 4/2001 | Gerpheide et al. ............ 345/173 |
| 6,297,811 | B1 | 10/2001 | Kent et al. |
| 7,129,935 | B2 | 10/2006 | Mackey |
| 7,218,124 | B1 | 5/2007 | Mackey et al. |
| 7,292,859 | B2 | 11/2007 | Park |
| 7,797,115 | B2 | 9/2010 | Tasher et al. |

(Continued)

FOREIGN PATENT DOCUMENTS

| WO | WO 2008/108514 A1 | 9/2008 |
| WO | WO 2010/079393 A1 | 7/2010 |

OTHER PUBLICATIONS

U.S. Appl. No. 13/855,911, filed Apr. 3, 2013 in the name(s) of Ziv Hershman.

(Continued)

*Primary Examiner* — Ryan A Lubit
(74) *Attorney, Agent, or Firm* — Oliff PLC

(57) ABSTRACT

Surface-capacitance-based multi-touch touch panel apparatus including a multiplicity of electrically conductive shapes e.g. diamonds arranged along at least one of rows and columns whose capacitance is measured by capacitive sensors; wherein the rows and columns include a set of linear arrays including at least one individual linear array which includes a plurality of first sets of shapes, each first set including $n >= 1$ shapes all shorted to a single set-specific capacitive sensor such that no two first sets are both shorted to a common capacitive sensor.

18 Claims, 16 Drawing Sheets

(56) References Cited

U.S. PATENT DOCUMENTS

| | | | |
|---|---|---|---|
| 8,462,127 B2 * | 6/2013 | Chiu et al. | 345/173 |
| 8,493,355 B2 * | 7/2013 | Geaghan et al. | 345/174 |
| 8,525,799 B1 * | 9/2013 | Grivna et al. | 345/173 |
| 2005/0270039 A1 | 12/2005 | Mackey | |
| 2008/0074398 A1 | 3/2008 | Wright | |
| 2010/0149108 A1 | 6/2010 | Hotelling et al. | |
| 2011/0017523 A1 | 1/2011 | Bulea et al. | |
| 2011/0062969 A1 | 3/2011 | Hargreaves et al. | |
| 2011/0062971 A1 | 3/2011 | Badaye | |
| 2012/0262419 A1 | 10/2012 | Hershman et al. | |

OTHER PUBLICATIONS

R. Seguine, "Capacitive sensing techniques and considerations—The basics" http://www.eetimes.com/design/automotive-design/4016274/Capacitive-sensing-techniques-and-considerations-The-basics, (2007).

Wikipedia article, "Capacitive Sensing" http://en.wikipedia.org/w/index.php?title=Capacitive_sensing&oldid=491422295, (2012).

* cited by examiner

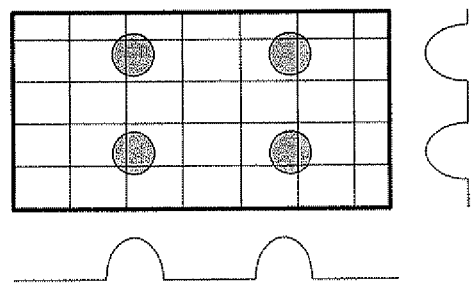
Four touch points
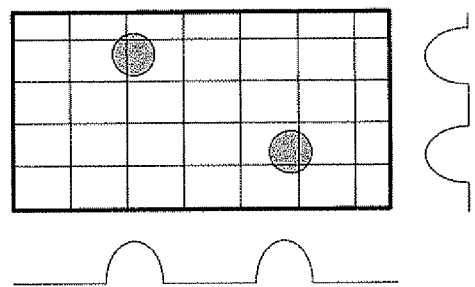
Two touch points
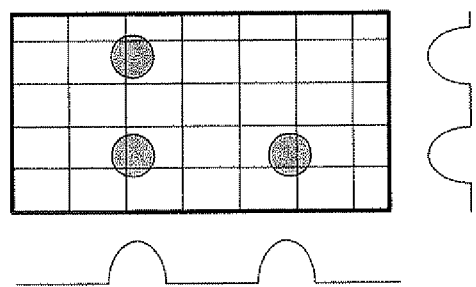
Three touch points
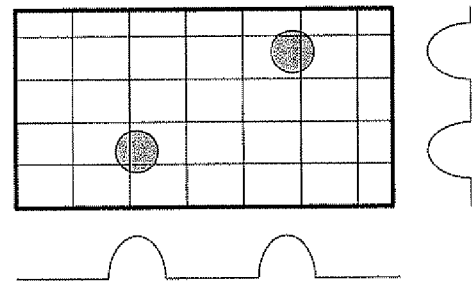
Two touch points
Figure 1
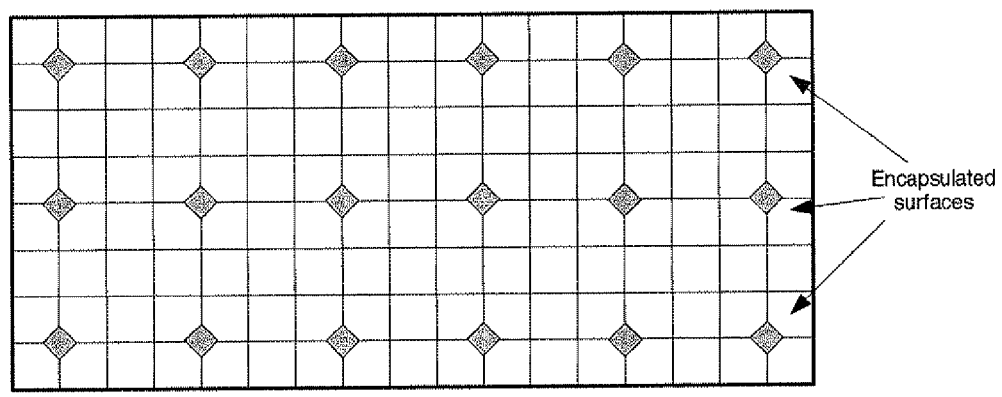
Figure 2

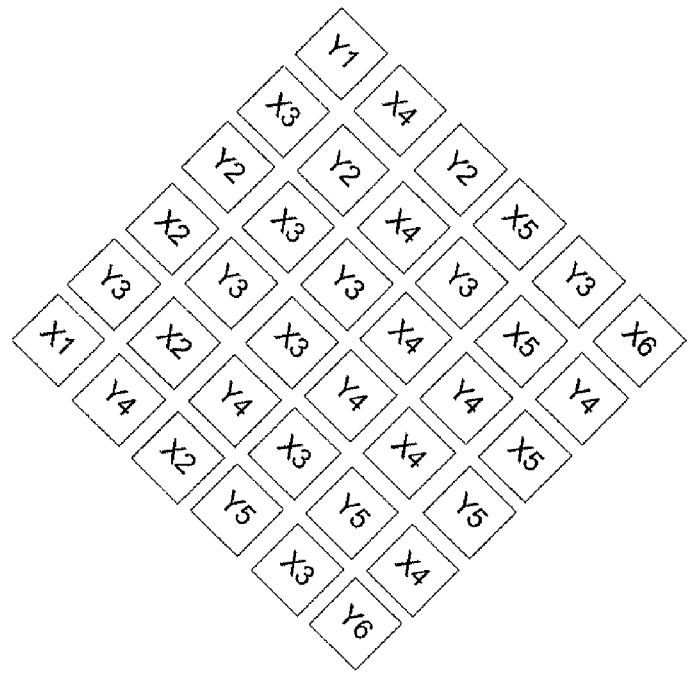
Figure 7e (Griller)
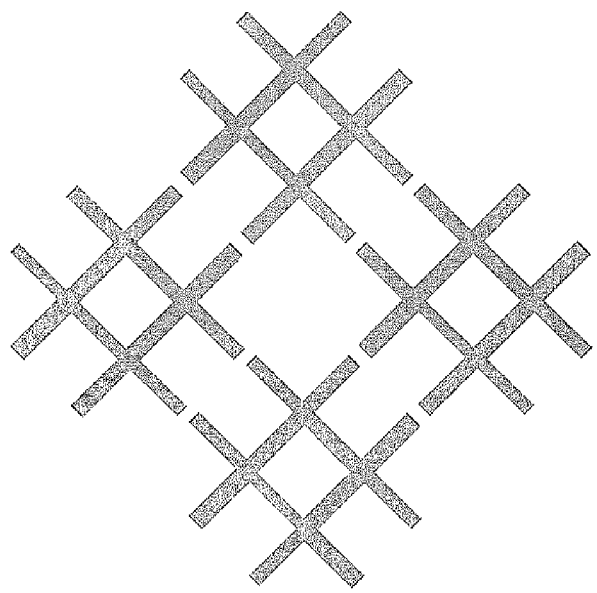
Figure 7f (Griller)

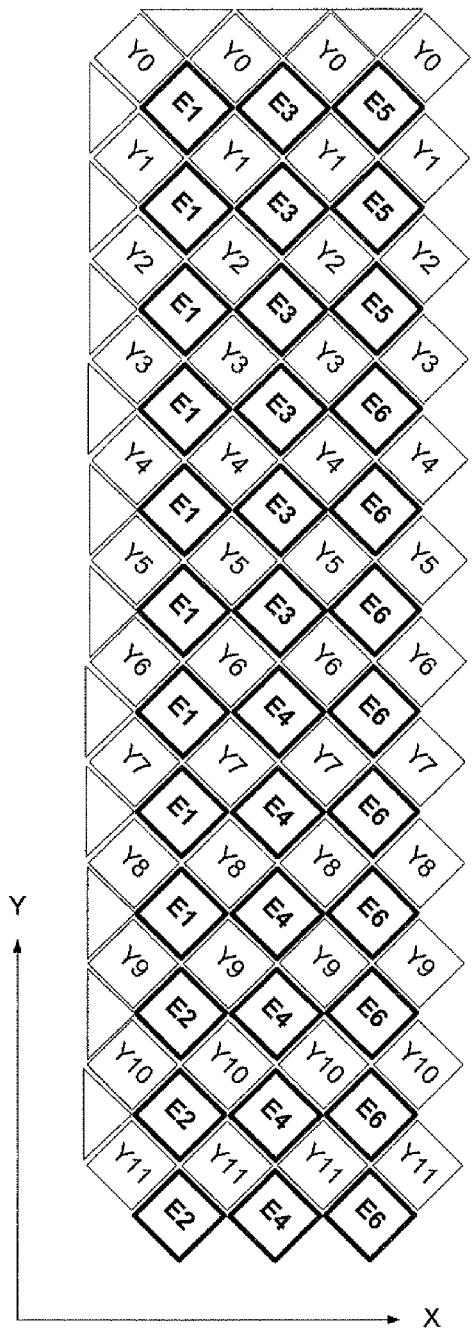
Figure 7g
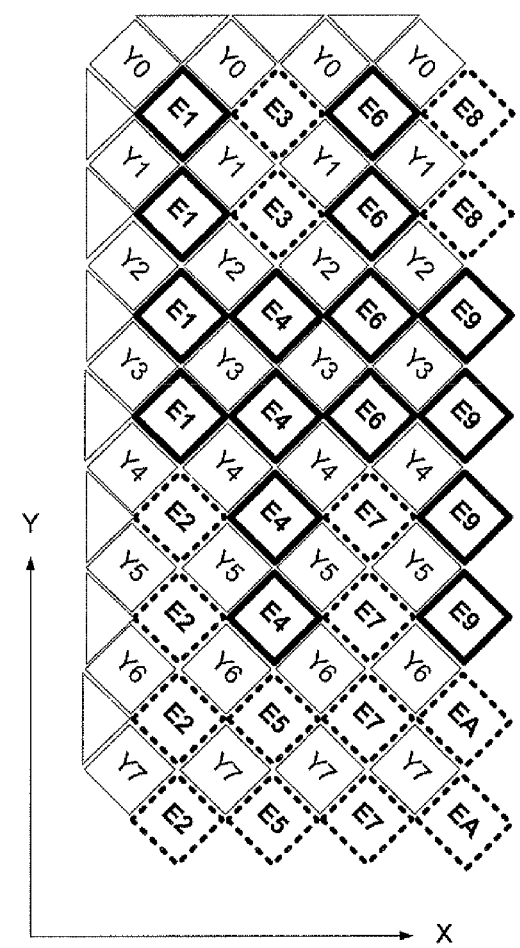
Figure 8a (Zipper-3)      Figure 8b (Zipper -2)

Fig. 11d

1170: Scan E sensors measuring capacitance of E-surfaces

↓

1180: Detect all E sensors triggered by touch point

↓

1190: Compute approximate location within panel of touch point based on coordinates of E sensor and typically at least one E neighbor thereof, e.g. at least one neighbor as defined by Fig. 11b

↓

1200: Fine adjustment of coordinates of approximate location using information re X and Y sensors triggered by the touch point

SYSTEMS AND METHODS FOR DETECTING MULTIPLE TOUCH POINTS IN SURFACE-CAPACITANCE TYPE TOUCH PANELS

REFERENCE TO CO-PENDING APPLICATIONS

Priority is claimed from U.S. provisional application No. 61/311,440, entitled "Systems and methods for using capacitive surface for detecting multiple touch points" and filed Mar. 8, 2010.

FIELD OF THE INVENTION

The present invention relates generally to touch panels and more particularly to capacitive touch sensor arrays.

BACKGROUND OF THE INVENTION

According to Wikipedia, capacitive sensing is a technology for detecting proximity, position, etc., based on capacitive coupling effects. Capacitive sensing is a human interface device (HID) technology, used for example to replace the computer mouse. Capacitive sensors can be found in many popular consumer products such as laptop trackpads, MP3 players, computer monitors and cell phones, but they are certainly not limited to these applications. Capacitive sensors can be constructed from many different materials, such as copper, Indium tin oxide (ITO) and printed ink. Copper capacitive sensors can be implemented on standard FR4 PCBs as well as on flexible material. ITO allows the capacitive sensor to be up to 90% transparent (for single layer solutions). The size and spacing of the capacitive sensor array are both very important to the sensor's performance. In addition to the size of the sensors, and their spacing relative to the ground plane, the type of ground plane used is very important. Since the parasitic capacitance of the sensors is related to the electric field path to ground, it is important to choose a ground plane that limits the concentration of electric field lines without a conductive object present.

A capacitive surface is defined as a surface, sensitive to touch of one or more objects, where the touch objects' locations can be computed using a measuring device connected to it.

There are two common ways for implementing a capacitive surface. The first is trans-capacitance or projective capacitive, where the object (finger, conductive stylus) alters the trans-capacitance coupling between row and column electrodes, which are scanned sequentially. Projective capacitance technology-based touch panels are capable of detecting multi-touch.

The second way for implementing a capacitive surface is termed Absolute Capacitance or Surface Capacitance where the object (finger, etc.) is sensed by the presence on the first and perpendicular axes of the surface.

Sometimes, a relative positioning is required. Subtraction of a preceding absolute position from the present absolute position yields the relative motion of the object/finger during that time.

Published U.S. Pat. Nos. 6,188,391, 7,129,935, 7,292,859 and 7,218,124 describe different patterns for two-way surface capacitive pads and methods to detect coordinates for single touch point only.

Published U.S. Pat. No. 5,825,352 describes a multiple finger contact sensing method for emulating mouse buttons and mouse operations on a touch sensor pad, and specifies that touch sensing technology is capacitive sensing, in which the location of a finger (or in some instances another object such as a stylus) over a sensing device is determined by virtue of variations in capacitance under and around the location of the finger. Typical applications of capacitive surfaces are touch screens and touch pads (or track pads) which employ a matrix of row and column electrodes and detect, for example, either the trans-capacitance between row and column electrodes or the effective capacitance to virtual ground. Some touch sensitive devices are known to use interpolation for a more precise identification of the location of a finger or stylus.

A typical limitation of the above prior art is the ability to sense only one finger at a time. Cursor movement is straightforward with one finger, and tapping of a finger on the surface of the pad can be detected and acted upon in a manner similar to detecting the actuation of a button on a mouse. Single and double taps can be used as simple equivalents of single and double mouse clicks.

With a single-finger touchpad, the click and drag function is more difficult. With single finger detection, dragging has been implemented with schemes such as uptap (finger lifted and placed down again quickly), tap-and-a-half, and sticky drag (drag lock turns on automatically after the finger is placed in one location without moving for more than a certain time, such as one second). All of these methods take more time and/or more finger motions than it takes to perform the equivalent function with a mouse, and are not intuitive to users familiar with electronic mice. Prior art touch pads are thus less attractive for general use than a mouse.

The above U.S. Pat. No. 5,825,352 claims "a method for detecting the operative coupling of multiple fingers to a touch sensor involving the steps of scanning the touch sensor to (a) identify a first maxima in a signal corresponding to a first finger, (b) identify a minima following the first maxima, (c) identify a second maxima in a signal corresponding to a second finger following said minima, and providing an indication of the simultaneous presence of two fingers in response to identification of said first and second maxima".

However, the presented method does not solve the ambiguity problem of multi-touch points (for example when the points are located in diagonal). The method presented in U.S. Pat. No. 5,825,352 is able to solve X and Y coordinates for multiple touch points when all points are located on the same axis, either X or Y. Another example of ambiguity is four touch points located in corners of square—the described method of U.S. Pat. No. 5,825,352 is not capable of distinguishing between four, three or two touch points. FIG. 1 shows several touch scenarios, all detected by the same row and column sensors.

The disclosures of all publications and patent documents mentioned in the specification, and of the publications and patent documents cited therein directly or indirectly, are hereby incorporated by reference.

SUMMARY OF THE INVENTION

Certain embodiments of the present invention seek to provide a capacitive surface design that enables the detection of the locations of multiple touch objects using a combination of row and column sensors and several isolated surfaces evenly distributed across the touch-surface, referred to as encapsulated surfaces or encapsulated sensors.

An apparatus and a method for resolving locations of multiple touches on a touch-surface device are described. The method may include detecting a number of touches on the touch-surface device, and resolving locations of multiple touches on the touch-surface device.

The apparatus may include a set of sensor elements disposed on a two-directional surface and a set of encapsulated isolated surfaces connected to additional sensors.

Certain embodiments of the present invention seek to provide a touch-surface device ambiguity resolution method, comprising detecting the presence of a plurality of substantially simultaneous touches on a touch-surface device at respective locations on the touch-surface device; and resolving locations of multiple substantially simultaneous touches of the plurality of substantially simultaneous touches on the touch-surface device.

Certain embodiments of the present invention seek to provide a touch-surface device ambiguity resolution method as above, wherein resolving locations comprises: sensing the presence of conductive objects on a two-directional surface of the touch-surface device; sensing for the presence of conductive objects near encapsulated surfaces of the touch-surface device; and determining locations of sensed presences by the two-directional surface and the encapsulated surfaces.

Certain embodiments of the present invention seek to provide a touch-surface device ambiguity resolution method as above wherein resolving locations comprises: sensing for the presence of conductive objects on a two-directional surface of the touch-surface device; sensing for the presence of conductive objects near groups e.g. arrays of encapsulated surfaces of the touch-surface device; and determining locations of sensed presences by the two-directional surface and the encapsulated surfaces.

Certain embodiments of the present invention seek to provide a touch-surface device ambiguity resolution method as above wherein weighted average, quadratic parabola function (examples) of the measured sensors weights is used to determine the locations of the sensed presences.

Certain embodiments of the present invention seek to provide a touch-surface device ambiguity resolution method as above wherein a weighted average of the measured sensors weights is used to determine the locations of the sensed presences.

Certain embodiments of the present invention seek to provide a touch-surface device ambiguity resolution method as above wherein resolving the number of actual touches comprises: sensing for presences of conductive objects on the encapsulated surfaces of the touch-surface device.

There is thus provided, in accordance with at least one aspect of the present invention, a surface-capacitance-based multi-touch touch panel apparatus including:

a. A touch panel having dimensions L, K respectively along first and second axes respectively and including a multiplicity of electrically conductive shapes, the touch panel including:

i. At least one row touch surface comprising a subset of the multiplicity of shapes arranged in a row along the first axis wherein all shapes in the subset are connected to a row-specific capacitive sensor; and ii. A plurality of approximate position indicative touch surfaces, wherein each approximate position indicative touch surface's dimensions along the first and second axes respectively are less than L and K respectively, and wherein the plurality of approximate position indicative touch surfaces are respectively uniquely connected to a respective plurality of approximate position indicative capacitive sensors; and b. A response analyzer operative to identify an approximate location of each touch along both of the axes, based on at least one response obtained from at least one of the approximate position indicative touch surfaces, to refine at least one component, along at least one of the first and second axes, of the approximate location using at least one response obtained from the at least one row touch surface, and to output a refined location for the touch along both of the axes, accordingly.

There is thus further provided, in accordance with at least one embodiment of the present invention, an apparatus wherein the multiplicity of shapes are spaced, thereby to define boundary areas between adjacent ones of the multiplicity of shapes and wherein the approximate position indicative touch surface covers at least some of the boundary areas.

There is thus yet further provided, in accordance with at least one embodiment of the present invention, an apparatus wherein each approximate position indicative touch surface, corresponding to a respective one of the plurality of approximate position indicative capacitive sensors, includes a subset of the multiplicity of electrically conductive shapes and wherein all shapes in the subset and only the shapes in the subset, are connected to the respective one of the plurality of approximate position indicative capacitive sensors.

There is thus yet further provided, in accordance with at least one embodiment of the present invention, an apparatus wherein the approximate position indicative touch surfaces are distributed such that any touch of the touch panel at least partly touches at least a portion of each of a unique set of shapes.

There is thus yet further provided, in accordance with at least one embodiment of the present invention, an apparatus wherein no shapes outside of the row are connected to the row-specific capacitive sensor.

There is thus yet further provided, in accordance with at least one embodiment of the present invention, an apparatus comprising at least one column touch surface comprising a subset of the multiplicity of shapes arranged in a column along the second axis wherein all shapes in the subset are connected to a column-specific capacitive sensor; and wherein the response analyzer is operative to refine both components, along both of the first and second axes, of the approximate location using at least one response obtained from the at least one row touch surface and at least one response obtained from the at least one column touch surface, and to output a refined location for the touch along both of said axes, accordingly.

There is thus yet further provided, in accordance with at least one embodiment of the present invention, an apparatus wherein the at least one row touch surface comprises at least two row touch surfaces interspersed with the plurality of approximate position indicative touch surfaces.

There is thus yet further provided, in accordance with at least one aspect of the present invention, a multi-touch method for detecting simultaneous multiple touches of a touch panel, the method including providing a surface-capacitance-based touch panel configured and operative to support multi-touch applications; and using the surface-capacitance touch panel to serve a multi-touch application.

There is thus yet further provided, in accordance with at least one embodiment of the present invention, a method wherein the touch panel serves at least one multi-touch application having an application-specific required resolution and wherein the using includes localizing a touch, along x and y axes, at a resolution greater than the application-specific required resolution, thereby to provide approximate x and y touch coordinates; and refining the approximate x and y touch coordinates along at least one of the x and y axes to a resolution which satisfies the application-specific required resolution.

There is thus yet further provided, in accordance with at least one embodiment of the present invention, a method wherein the touch panel includes capacitance sensors and wherein a pattern of intensities read from several adjacent sensors is used to accurately position a touch of the touch panel, rather than localizing the touch simply by identifying coordinates of an individual one of the capacitance sensors whose capacitance reading yielded a local maximum intensity.

Each intensity value typically comprises a measured capacitance value's distance from a basic capacitance value measured in a no-touch situation.

There is thus yet further provided, in accordance with at least one embodiment of the present invention, an apparatus wherein each approximate position indicative touch surface includes only that number of shapes which together generate a total touch surface whose dimensions fall within an application-specific resolution defined along at least one of the touch panel's axes.

There is thus yet further provided, in accordance with at least one embodiment of the present invention, an apparatus wherein each approximate position indicative touch surface includes a plurality of shapes.

There is thus yet further provided, in accordance with at least one embodiment of the present invention, a method wherein the touch panel has dimensions L, K respectively along first and second axes respectively and includes a multiplicity of electrically conductive shapes, and wherein the touch panel includes:

i. At least one row touch surface comprising a subset of the multiplicity of shapes arranged in a row along the first axis wherein all shapes in the subset are connected to a row-specific capacitive sensor; and ii. A plurality of approximate position indicative touch surfaces, wherein each approximate position indicative touch surface's dimensions along the first and second axes respectively are less than L and K respectively, and wherein the plurality of approximate position indicative touch surfaces are respectively uniquely connected to a respective plurality of approximate position indicative capacitive sensors.

There is thus yet further provided, in accordance with at least one embodiment of the present invention, a method wherein the using comprises scanning approximate position indicative capacitive sensors to identify at least one individual approximate position indicative capacitive sensor triggered by simultaneous multiple touches, computing approximate locations of the simultaneous multiple touches based on a known location of the individual approximate position indicative capacitive sensor; and refining the approximate locations to obtain precise locations for the simultaneous multiple touches, using information from capacitive sensors other than the approximate position indicative capacitive sensors.

There is thus yet further provided, in accordance with at least one embodiment of the present invention, a method wherein the computing is also based on a known location of at least one neighboring approximate position indicative capacitive sensor to which is shorted at least one shape adjacent to a shape shorted to the individual approximate position indicative capacitive sensor.

There is thus yet further provided, in accordance with at least one embodiment of the present invention, an apparatus wherein the approximate position indicative touch surfaces are distributed densely enough over the touch panel to ensure that each finger-sized location within the touch panel, when touched by a finger, triggers a group of finger-sized capacitive sensors to generate a corresponding group of intensities which is unique to the touch panel in that it is not reproduced when any other location within the touch panel is touched.

There is thus yet further provided, in accordance with at least one embodiment of the present invention, a method wherein the using comprises identifying an approximate location of each touch along both of the axes, based on at least one response obtained from at least one of the approximate position indicative touch surfaces, refining at least one component, along at least one of the first and second axes, of the approximate location using at least one response obtained from the at least one row touch surface, and outputting a refined location for the touch along both of the axes, accordingly.

There is thus yet further provided, in accordance with at least one embodiment of the present invention, an apparatus wherein the approximate position indicative touch surfaces are distributed such that any touch of the touch panel at least partly touches at least a portion of at least one of the approximate position indicative touch surfaces, hence can be localized.

There is thus yet further provided, in accordance with at least one embodiment of the present invention, an apparatus wherein the shapes comprise diamonds.

There is thus yet further provided, in accordance with at least one embodiment of the present invention, an apparatus wherein the distance between approximate position indicative touch surfaces is at least the size of a human finger.

There is thus yet further provided, in accordance with at least one aspect of the present invention, a computer program product, comprising a computer usable medium having a computer readable program code embodied therein, the computer readable program code adapted to be executed to implement a method for detecting simultaneous multiple touches of a touch panel, the method including providing a surface-capacitance-based touch panel configured and operative to support multi-touch applications; and using the surface-capacitance touch panel to serve a multi-touch application.

Also provided is a computer program product, comprising a typically non-transitory computer usable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 1 is a simplified semi-pictorial semi-schematic diagram of a touch surface system with integral capacitance sensing functionality, showing ambiguity situations with detection of a number of multiple touches on a touch-surface device at respective locations on the touch-surface device.

FIG. 2 is a simplified illustration of a touch surface system with encapsulated isolated touch surface.

FIGS. 7a-7e are simplified semi-pictorial semi-schematic diagrams of touch surface systems with encapsulated, isolated surfaces; in this example, a group of encapsulated surfaces is connected to a separate sensor.

FIG. 7f is a bottom layer of the pattern of FIG. 7e.

FIG. 7g is an illustration of an area typically underlying a finger of a human user, drawn in scale relative to FIGS. 7a-7f, FIGS. 8a-8b and FIGS. 9a-9d.

FIGS. 8a-8b and 9a-9b are examples of grouped encapsulated surfaces connected to a separate sensor.

FIG. 11d is a simplified flowchart illustration of a general method for localizing multiple touches to a Surface-capacitance-based multi-touch screen apparatus provided in accordance with certain embodiments of the present invention.

FIG. 12b is the top layer (corresponding to FIG. 7e) of the example layout of FIG. 12a.

DETAILED DESCRIPTION OF CERTAIN EMBODIMENTS

Certain embodiments of the present invention solve multipoint ambiguity situations of a capacitive surface. Two-directional (or two-way) capacitive surface scans, implemented by row and column sensors, are well known in the art.

Figure 3:
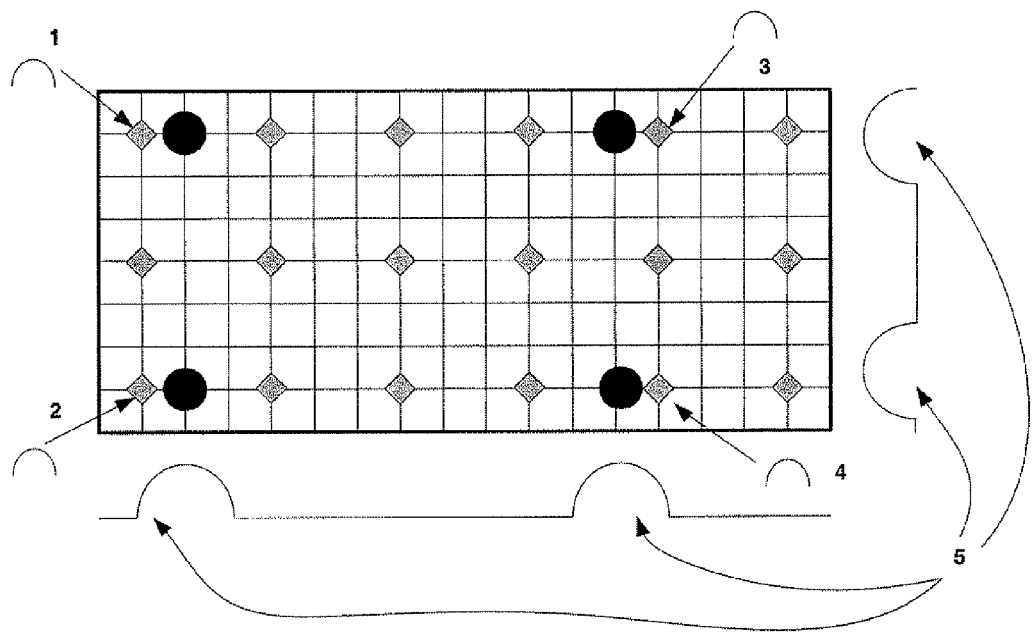
FIG. 3 is a simplified illustration of a method for solving number and location of four touch presences.
Figure 5:
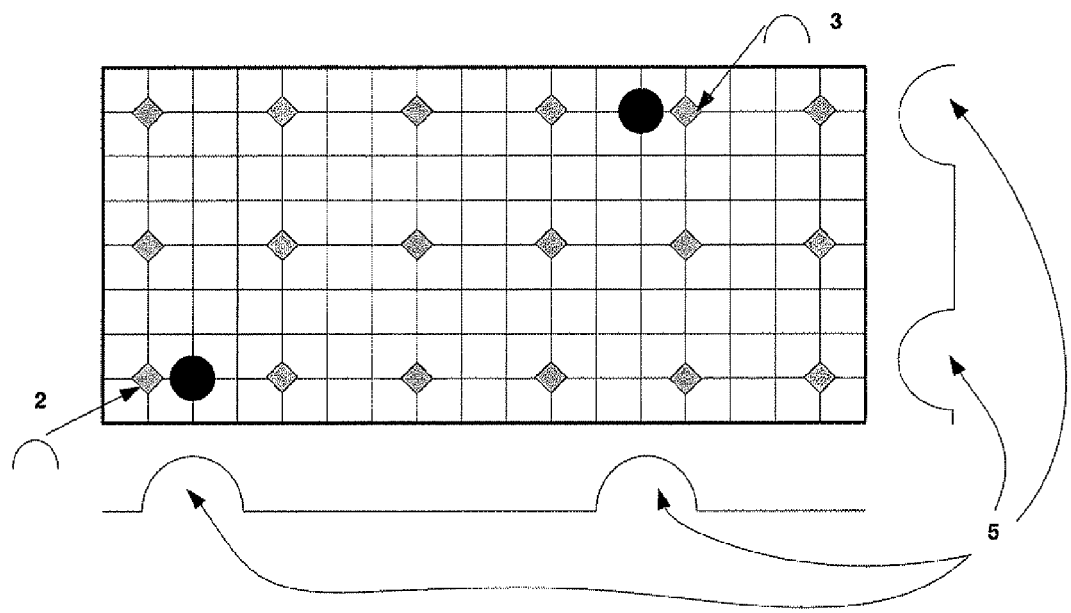

Certain embodiments of the present invention seek to provide a method and system to solve the multi point ambiguity problem, by using isolated surfaces encapsulated in a two-directional capacitive surface. Every encapsulated surface is connected to a separate sensor, measures its capacitance, and provides information about presence and weight of touch point (finger) around its area. FIG. 2 shows a simplified embodiment of the invention: encapsulation of isolated capacitive surfaces. Touch points are detected by measuring the capacitance of encapsulated surfaces and the two-directional surface. The inherent ambiguity of a two-directional surface is solved by adding encapsulated surfaces that provide additional information about location of present touch points. FIGS. 3 and 5 demonstrate how the ambiguity of the cases presented in FIG. 1 is resolved.

FIG. 3 shows an example of four touch points. Encapsulated sensors (1), (2), (3) and (4) provide information about the number of touch points, and weight of these points for following mapping to Cartesian coordinates.

Figure 4:
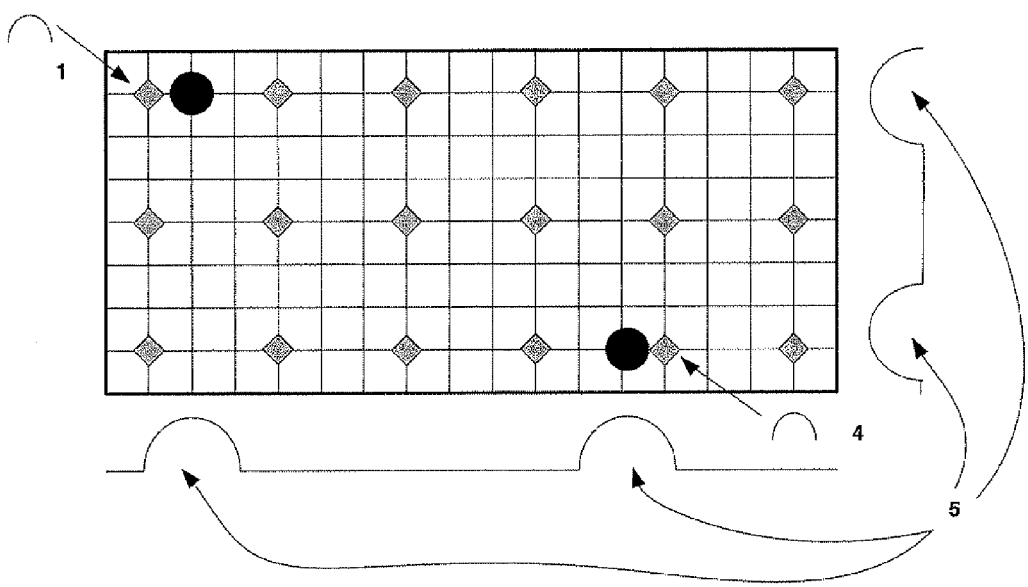
FIGS. 4 and 5 are simplified illustrations of a method for solving number and location of two diagonal touch presences.

FIGS. 4 and 5 show two examples of two touch points located diagonally. The weights measured by the two-direction touch surface (5) are the same for FIGS. 4 and 5, and the same as for FIG. 3. This ambiguity with touch points location and number of touch points is solved by encapsulated sensors (1), (2), (3) and (4).

Four encapsulated sensors (1), (2), (3) and (4) measure number and location of touch points. Two encapsulated sensors (1) and (4) measure number and location of touch points. Two encapsulated sensors (2) and (3) measure number and location of touch points.

Figure 6:
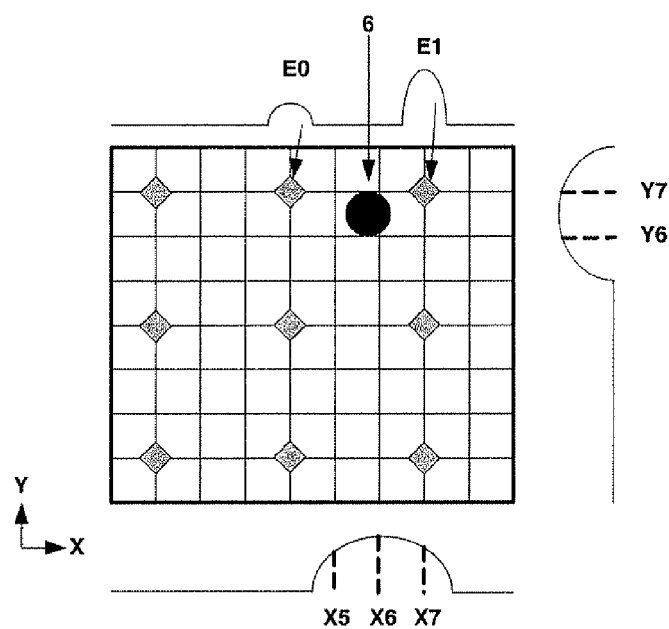
FIG. 6 is a simplified illustration of a method for computation of locations of the touch presence e.g. Cartesian coordinates of the touch point.

Cartesian coordinates of each touch point are solved by interpolation of the measured capacitance of the encapsulated surfaces and the two-directional surface lines. FIG. 6 illustrates a general case of coordinate's computation for touch point (6).

Coordinates of encapsulated sensors (E1), (E2), Y sensors (Y6), (Y7) and X sensors (X5), (X6) and (X7) are pre-defined (known) by the surface matrix topology. The measured weights of the encapsulated sensors, the Y sensors and the X sensors are represented as $[w_1, w_2, \ldots, w_n]$, The touch point X coordinate is computed as a quadratic function (parabola) of three points or as a weighted average (for example) of all X and E sensors, and the Y coordinate is computed from the Y and E sensors in a similar way. X coordinate computation is shown in the following formula (weighted average—Formula I):

$$\bar{x} = \frac{\sum_{i=1}^{n} w_i x_i}{\sum_{i=1}^{n} w_i},$$

which means:

$$\bar{x} = \frac{w_1 x_1 + w_2 x_2 + \ldots + w_n x_n}{w_1 + w_2 + \ldots + w_n}.$$

Or by quadratic function (parabola)—formula II:
$Wx = a*X^2 + b*X + c$, where a, b and c constants defined by solving:

$$\begin{cases} Wex_1 = a*EX_1^2 + b*EX_1 + c \\ Wex_2 = a*EX_2^2 + b*EX_2 + c \\ Wex_3 = a*EX_3^2 + b*EX_3 + c \\ \text{Where } EX_1, EX_2 \text{ and } EX_3 \text{ are horizontal coordinates of} \\ E \text{ Sensors: } E1, E2, E3, \text{ and } W \text{ values are measured} \\ \text{weights on these } E \text{ sensors.} \end{cases}$$

After detecting a preliminary position of the touch point, a more precise computation is done using another quadratic function (parabola) taking in consideration neighbor X sensors EX−1, EX and EX+1. The coordinate Y is computed using the above quadratic function and weighted average for each touch point.

Examples of surface matrix with encapsulated surfaces are shown in FIGS. 7a-7e, 8a-8b and 9a-9b, where encapsulated surfaces are marked E, First axis surfaces are marked Y and Perpendicular axis surfaces are marked X.

FIG. 7 illustrates examples of touch surfaces with encapsulated touch surfaces. Each encapsulated touch surface is connected to a separate sensor.

FIGS. 8a-8b and 9a-9b illustrate examples of touch surfaces with grouped encapsulated touch surfaces. Each group of encapsulated touch surfaces is connected to a separate sensor. Groups of encapsulated touch surfaces are marked by ellipse.

It is appreciated that surface-capacitance or self-capacitance touch panels do not support multi-touch applications. Certain embodiments of the present invention seek to provide surface-capacitance or self-capacitance touch panels configured and operative to support multi-touch applications.

From here on, the following terminology is employed:
Touch panel=touch pad or track pad or touch screen including a multiplicity of electrically conductive shapes e.g. polygons such as quadrilaterals e.g. diamonds (90 degree angles, 4 equal sides) or even circles
Touch surface=a set of one or more electro-conductive shapes e.g. diamonds connected to (shorted to) a single unit that measures capacitance. It is appreciated that here and throughout the specification, mutatis mutandis, any suitable triangle, quadrilateral or other shape can be used to replace the diamonds provided in the illustrated embodiment and mentioned in the present description, by way of example.
Capacitive sensor=unit e.g. sampling logic that measures capacitance of exactly one touch surface.

Touch capacitive device=capacitive measurement device=a set of capacitive sensors serving an entire touch panel.

Linear array=a row or column or diagonal of diamonds (or other electroconductive shapes) extending along a portion of, or all of, the relevant dimension (x, y or diagonal) of the touch panel.

Set of diamonds (or set of shapes)=diamonds (or shapes) which need not necessarily be disposed adjacently to one another.

The above terms may be construed either in accordance with any definition thereof appearing in the prior art literature or in accordance with the specification, or as above. The term "overlies", "touches" and "activates" are used generally interchangeably to describe contact between a finger and at least a portion of (i.e. some or all of) a touch surface or diamond.

Certain embodiments of the present invention seek to provide a plurality of "E-type" touch surfaces, wherein a diamond activates the capacitance sensor serving that touch surface if and only if the diamond is included in the touch surface, and wherein the dimensions of each touch surface are selected such that two touches overlying or activating portions of or the entirety of the same touch surface are, for the purposes of a particular application, functionally equivalent.

Certain embodiments of the present invention seek to provide X-type or Y-type touch surfaces used to refine approximate X,Y coordinates provided by an E-type touch surface, and wherein the X-type or Y-type touch surfaces are characterized in that they extend along some or typically all of one of the dimensions of the touch panel and extend along a portion of the other dimension of the touch panel, which is less than the application-specific resolution characterizing an application to be served by the touch panel.

One problem which certain embodiments shown and described herein seek to solve is how to localize simultaneous multiple touches of an Absolute Capacitance or Surface Capacitance technology-based touch surface, without burdening the apparatus with the impractical solution whereby a touch sensor is wired to almost every diamond individually and without resorting to unacceptably sized diamonds. As shown, one solution to this problem is to provide "encapsulated" diamonds, also termed herein E-diamonds, distributed over the touch panel. E-surfaces refer to one or more typically adjacent diamonds which are shorted to a sensor, and have pre-defined known X and Y coordinates.

Preferably, there are no "dead" areas; any touch of any portion of the touch panel can be localized by virtue of a unique set of sensors being activated thereby in a unique pattern. Typically, the totality of E-diamonds provided in a touch panel can be partitioned into n sets of adjacent E-diamonds. These sets may be disposed close to one another e.g. as shown in the "zipper" embodiments of FIGS. 8a-8b, but they are not attached e.g. are not electrically connected to the E-diamonds of any other set, and all diamonds are all wired to a single joint sensor which is unique to that set, such that the number of sensors which wire the E-diamonds totals n. According to certain embodiments, each diamond other than the E-diamonds, is wired to a single sensor serving the entire row in which that diamond resides; if such a row exists, the diamond is termed an X diamond. According to certain embodiments, a diamond other than the E-diamonds is wired to a single sensor serving the entire column in which that diamond resides; if such a column exists, the diamond is termed a Y-diamond.

E diamonds are typically distributed over the touch panel in such a way as to enable detection of touch points at any location of the touch surface, avoiding "dead" zones. Typically, the E diamonds are distributed such that any touch of the panel activates at least one of the E diamonds.

More specifically, FIGS. 7a-7f, 8a-8b and 9a-9d illustrate diamond arrangements in a surface-capacitance-based multi-touch panel apparatus, according to various embodiments of the present invention. It is appreciated that the patterns shown may repeat over and over again throughout the length and breadth of the particular touch panel. Typically:

a. All X diamonds, in all repetitions along the X axis, are shorted to a single sensor;

b. All Y diamonds, in all repetitions along the Y axis, are shorted to a single sensor.

c. All identically numbered E diamonds within a particular repetition are shorted to a single sensor whereas a touch surface (sequence or, more generally, set of E diamonds) bearing the same number in other repetitions, is shorted to a different single sensor.

Figure 7A:
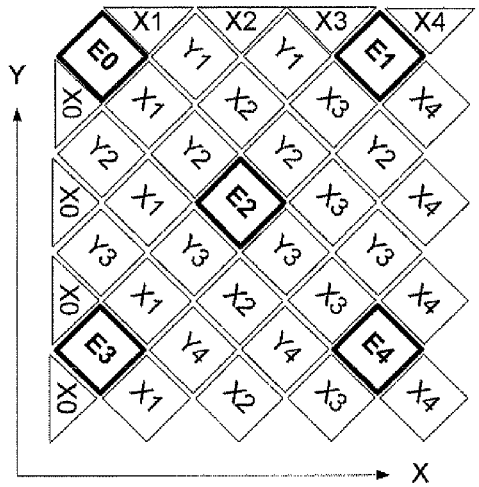

FIG. 7a is a diagram of a surface-capacitance or self-capacitance touch panels which is conventional except that a few of the conventional X-diamonds or Y-diamonds are replaced by E-diamonds which are neither shorted to a per-row capacitance sensor as are the Y sensors, nor to a per-column capacitance sensor as are the X-sensors. Instead, each E-diamond is shorted to its own individual capacitance sensor. It is appreciated that were it not for presence of the E-diamonds, and if the touch panel were touched by two fingers at coordinates 1, 2 and 5,6 respectively, the result would be activation of 2 X-sensors (1 and 5) and 2 Y-sensors (2 and 6) such that it would be impossible to disambiguate the possible input events namely a pair of touches at 1, 2 and 5,6; as opposed to the following pair of touches: 1,6 and 2,5.

Figure 7B:
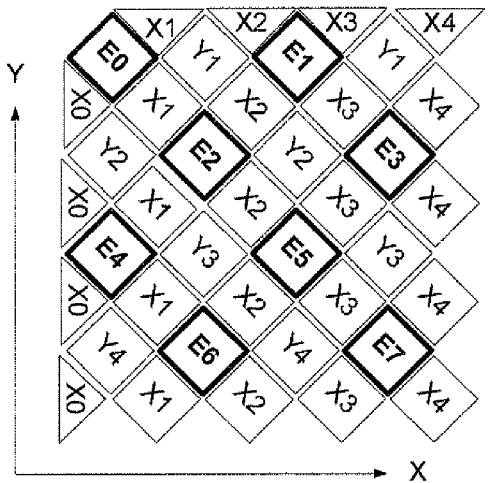
Figure 7C:
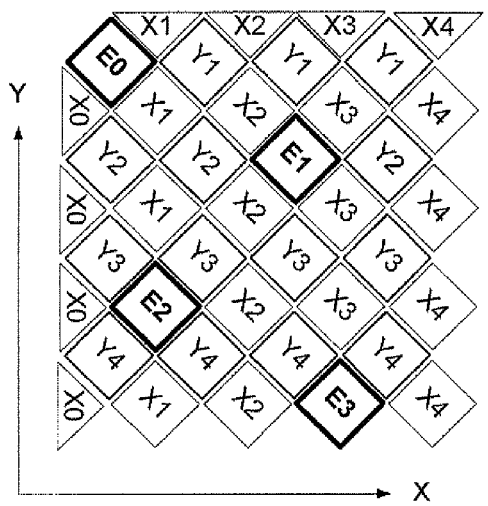
Figure 7D:
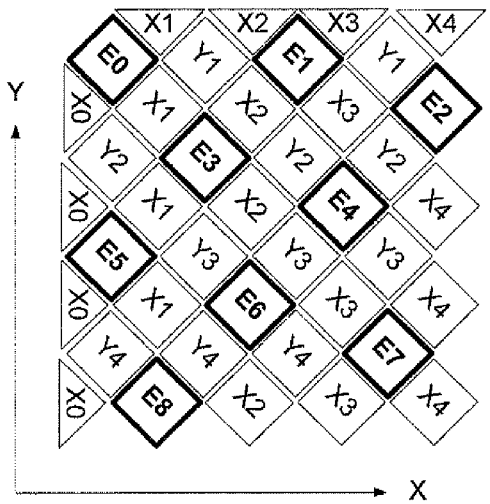

The embodiment of FIGS. 7a and 7c may have dead areas. The embodiment of FIG. 7b is relatively costly due to the large density of E-diamonds. In the embodiment of FIG. 7b, all E diamonds extend along the y-axis; whereas in the embodiment of FIG. 7d, E-diamonds extend along both the X- and Y-axes.

The embodiment of FIG. 7e is termed the "griller"; it may suffer from a too high level of noise due to insufficient area of the E-sensors accumulating under a user's finger, as best appreciated by comparing FIG. 7f, showing E-sensors, and FIG. 7g showing a typical finger size, in the same scale. It is appreciated that the "finger" of FIG. 7g represents the smallest finger that the apparatus accommodates; all fingers are assumed to be at least that big (at least 6.5 mm in diameter). The embodiments of FIGS. 8a-8b are termed "zipper" embodiments.

Figure 9A:
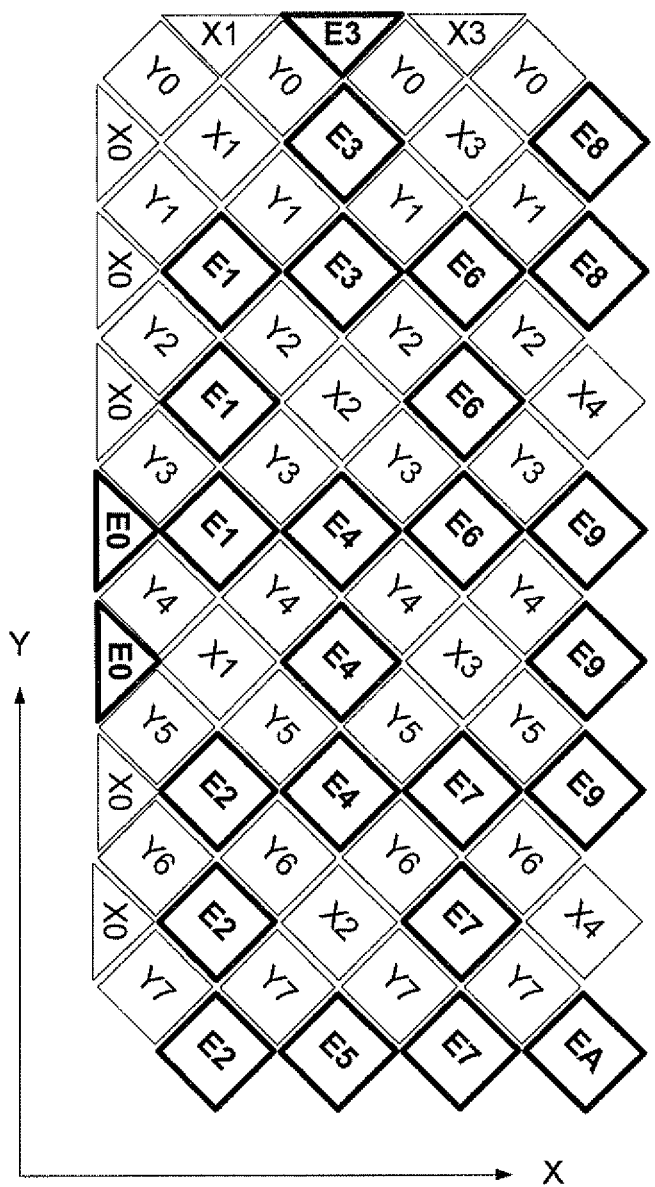
Figure 9B:
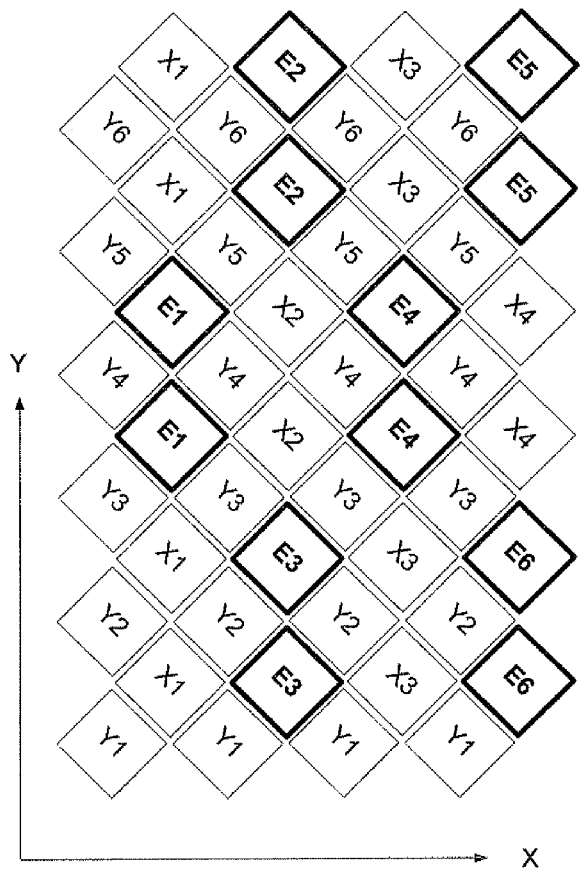

The embodiments of FIGS. 8a-8b, 9a, and 9b, particularly FIG. 9b, have been found to be particularly successful in that there are no dead areas on the one hand, and there is not a particularly high required number of sensors, on the other hand, because there are not a few non-E diamonds and/or because the E diamonds are provided in runs, all shorted to a single sensor, rather than as isolated diamonds each shorted to its own sensor as shown in FIGS. 7a-7d. The embodiments of FIGS. 8a-8b and 9a-9b are characterized by "uniqueness" i.e. any location of the size shown in, say, FIG. 7g (finger size) extends over a unique set of diamonds including at least one E-diamond, hence can be localized. It is appreciated that the particular finger size illustrated in FIG. 7g is merely for illustration purposes and is not intended to be limiting. For example, y10, y11, E2 and E4 are mutually adjacent only once over the entire touch panel composed of repetitions of FIG. 8a; similarly, y1, y2, and E3 are mutually adjacent only once over the entire touch panel composed of repetitions of FIG. 8a; and such is the case for all sets of mutually adjacent diamonds—they occur only once over the entire touch-panel.

(y10, y11, E2 and E4 occur in each repetition of the pattern of FIG. 8a, however, E2 and E4 differ—i.e. are shorted to a different sensor—for each and every repetition.)

It is appreciated that combining intensity information gathered from Y sensors and E-sensors allows a finger-touch to be localized. For example, in the embodiment of FIG. 8a, the sensor shorted to the E1 diamonds is uniquely (over the entire touch panel) assigned to the 9 vertically adjacent E1-diamonds shown, and as for vertical localization within the swathe occupied by the 9 E-diamonds, this is achieved by noting which Y-sensor from among Y0-Y8 is detecting above-threshold intensity. An example method for localizing touch points is described herein with reference to FIGS. 11c-11d.

The pattern of FIG. 9a is a "compromise" between the patterns of FIGS. 7a-7d on the one hand, and FIGS. 8a-8b on the other hand. FIG. 9b is similar to FIG. 9a except that the E's occur as adjacent pairs rather than as adjacent triplets as in FIG. 9a.

Typically, each of the patterns of FIGS. 7a-7f, 8a-8b and 9a-9d is implemented in a two-layer layout, in which, typically, the E- and X-diamonds are implemented in the top layer and the Y-diamonds are implemented in the bottom layer which is sometimes slightly less sensitive. It is appreciated that in the illustrated embodiments, E and Y diamonds cannot co-exist in the same layer since this would cause a short; whereas E- and X-diamonds' connections to the sensors are mutually parallel hence can co-exist in the same layer.

It is appreciated that X and Y as used herein without loss of generality; X-diamonds can, if desired, be deemed Y and vice-versa.

When, in a particular touch panel, the patterns of FIGS. 7a-7f, 8a-8b and 9a-9d repeat themselves, say K' and L' times along the x and y axes of the panel respectively, the X1 diamonds of all K repeats all are shorted to a single capacitive sensor assigned to the column 1 along which the X1 diamonds lie, and the same is true respectively for the X2's, X3's, etc. which are respectively shorted to the capacitive sensor assigned to column 2, the capacitive sensor assigned to column 3, etc. Similarly, the Y1 diamonds of all K' repeats all are shorted to a single capacitive sensor assigned to the row 1 along which the Y1 diamonds lie, and the same is true respectively for the Y2's, Y3's, etc. which are respectively shorted to the capacitive sensor assigned to row 2, the capacitive sensor assigned to row 3, etc. In contrast, the E1's of the K' repeats are respectively shorted to K' different capacitive sensors, not to a single common sensor, and the same is true respectively for the E2's, E3's, etc.

Figure 9C:
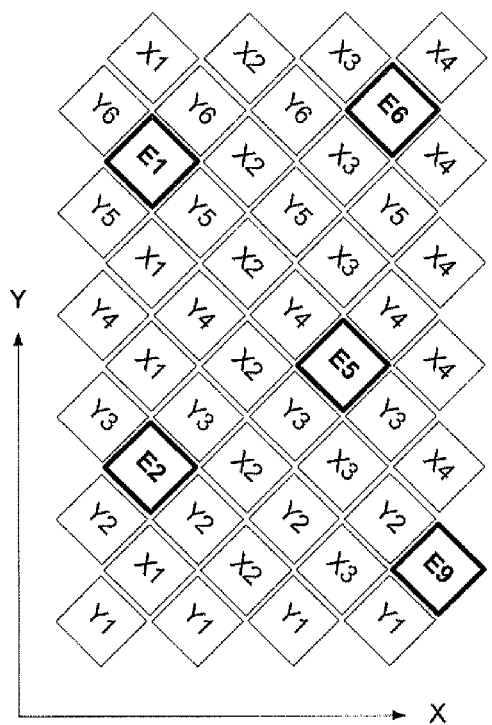
FIGS. 9c-9d are other examples of patterns of encapsulated surfaces within a touch panel in accordance with certain embodiments of the present invention.
Figure 9D:
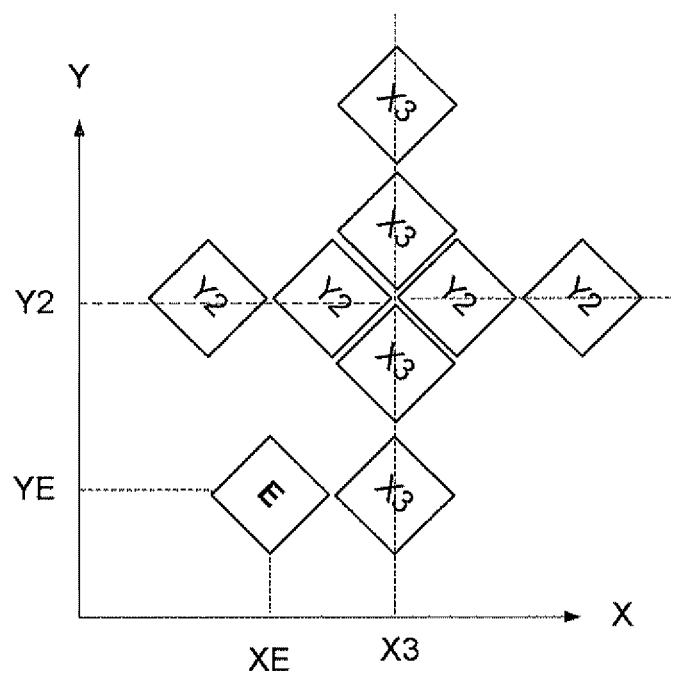

It is appreciated, particularly with reference to FIG. 9d, that X and Y sensors typically provide only one coordinate for localization of touches to the touch panel, whereas each E sensor typically provides two pre-defined unique coordinates.

It is appreciated that typically, the size of each diamond relative to the presumed impact of finger on diamond capacitance and size of each finger, as shown in FIG. 7g, is such that the finger, when centered on a diamond, always overlies, wholly or partially, three diamonds along the x-axis and three along the y-axis. "Zipper" embodiments 8a and 8b are characterized in that no two finger locations overlie the same set of diamonds. It is appreciated that the finger can be precisely positioned by (a) noting the set of diamonds which the finger overlies, i.e. activates; and (b) noting the relative intensities of each activated diamond, and taking into account that generally speaking, the intensity of each activated diamond may be a function of both effective finger capacitance (depending on the extent of contact between finger and diamond) and diamond capacitance. Typically, the intensity of each activated diamond is proportional to the impact of finger capacitance to the diamond capacitance.

For example, if a finger is centered on an individual E2 diamond in FIG. 8a, the intensity pattern read from the activated diamonds would typically include a high intensity from the E2 diamond and lower but generally equal intensities from the surrounding y-diamonds, as well as even lower intensities from the E-diamonds above and below the individual E2 diamond. In contrast, if the finger is centered at a vertex of two E-diamonds and two Y-diamonds, the intensity pattern would include four approximately equal intensities from the four diamonds bordering the vertex. If the finger is centered on a border between an E- and a Y-diamond, the intensities of those two diamonds would be high, and low intensities would be read from adjoining diamonds, and so forth.

According to certain embodiments of the invention, then, a "map" or pattern of intensities read for several adjacent sensors is used to accurately position a touch of the touch panel, e.g. as described in detail herein, rather than localizing the touch point simply by identifying coordinates of a sensor whose reading yielded the local maximum intensity.

Figure 10A:
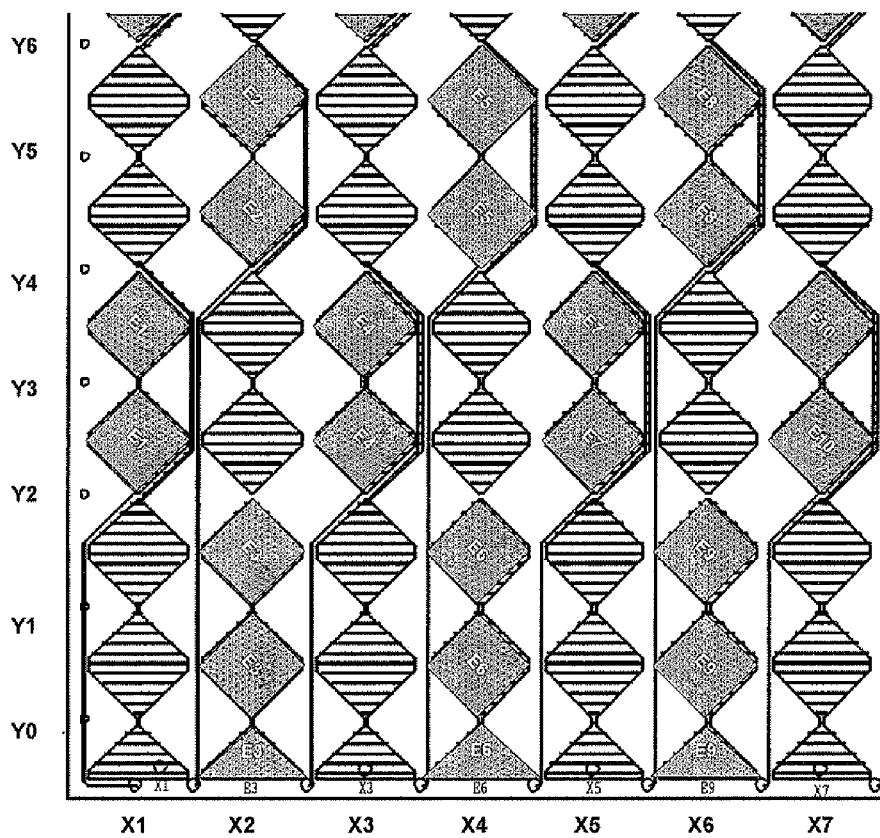
FIGS. 10a-10c are example layouts implementing patterns of encapsulated surfaces within a touch panel provided in accordance with certain embodiments of the present invention; it is appreciated that any suitable tool, such as Alegro, may be employed to generate layouts for any of the patterns shown and described herein.
Figure 10B:
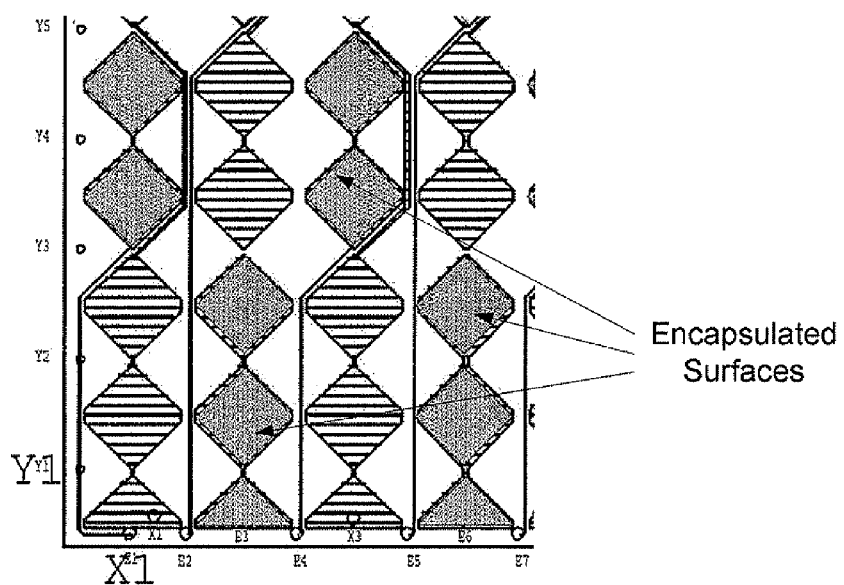
Figure 10C:
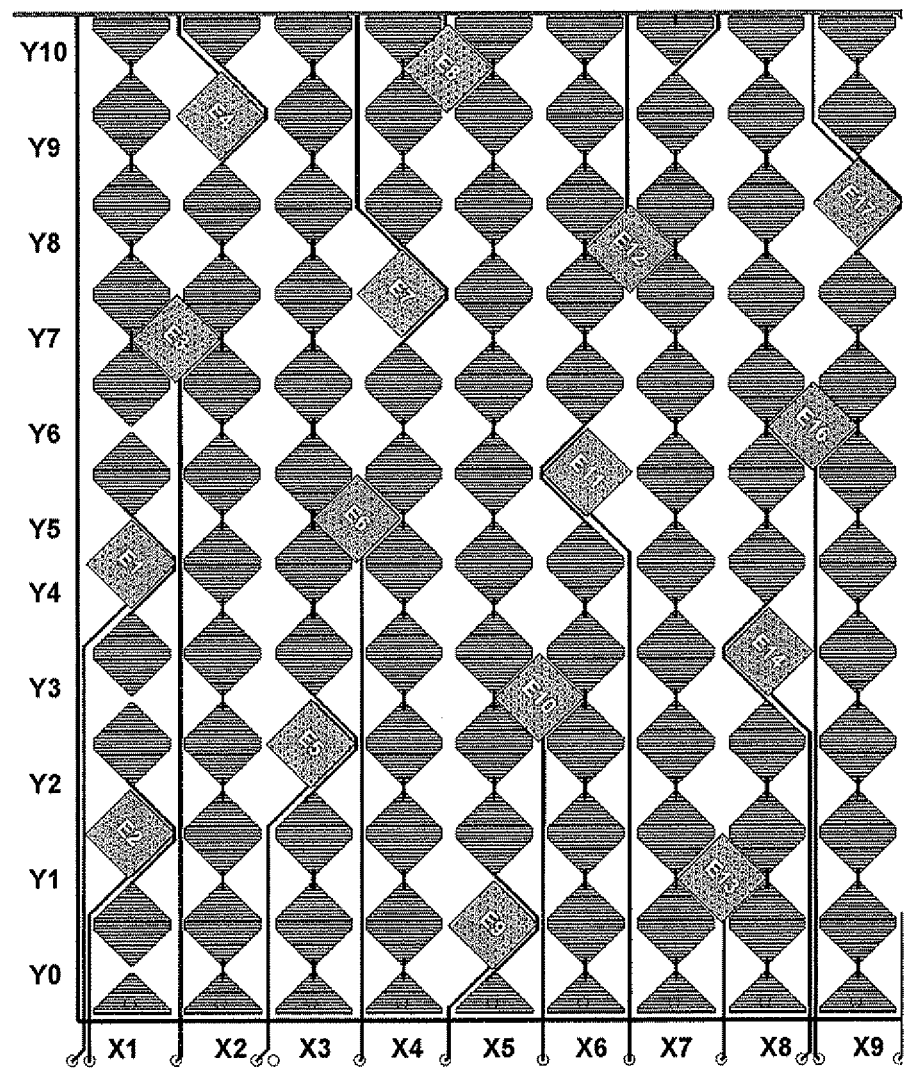

FIGS. 10a-10c are example layouts implementing patterns of encapsulated surfaces within a touch panel provided in accordance with certain embodiments of the present invention.

In particular, FIG. 10a is an example layout of a top layer of an apparatus constructed and operative in accordance with an embodiment of the present invention.

FIG. 10b is a detail of a portion of the layout of FIG. 10a showing encapsulated diamonds including one or more encapsulated diamonds therein (also termed herein E-diamonds and E-diamonds respectively; indicated in gray). X-diamonds are indicated by horizontal hatching and Y-diamonds are in the bottom layer hence are located at the white portions of FIGS. 10a-10b. As shown, various sets of E-diamonds are each shorted to their own joint sensor, as indicated by sensors E1, E2, etc. each shorting its own set of E-diamonds. The bottom Y layer is illustrated in white in FIG. 10a.

The layout of FIG. 10c is an example layout for the pattern of FIG. 9c.

Typically, the Y diamonds form the bottom layer (for example) of a layout, whereas the layer including X and E diamonds is the top layer, thereby to obtain better sensitivity. Fillers of X and E diamonds may be provided to improve impact of the finger's capacity on the second layer. Fillers, namely a conductive surface connected to no sensor, are typically employed only if the second layer is affected by isolation between bottom and top layers.

Figure 11A:
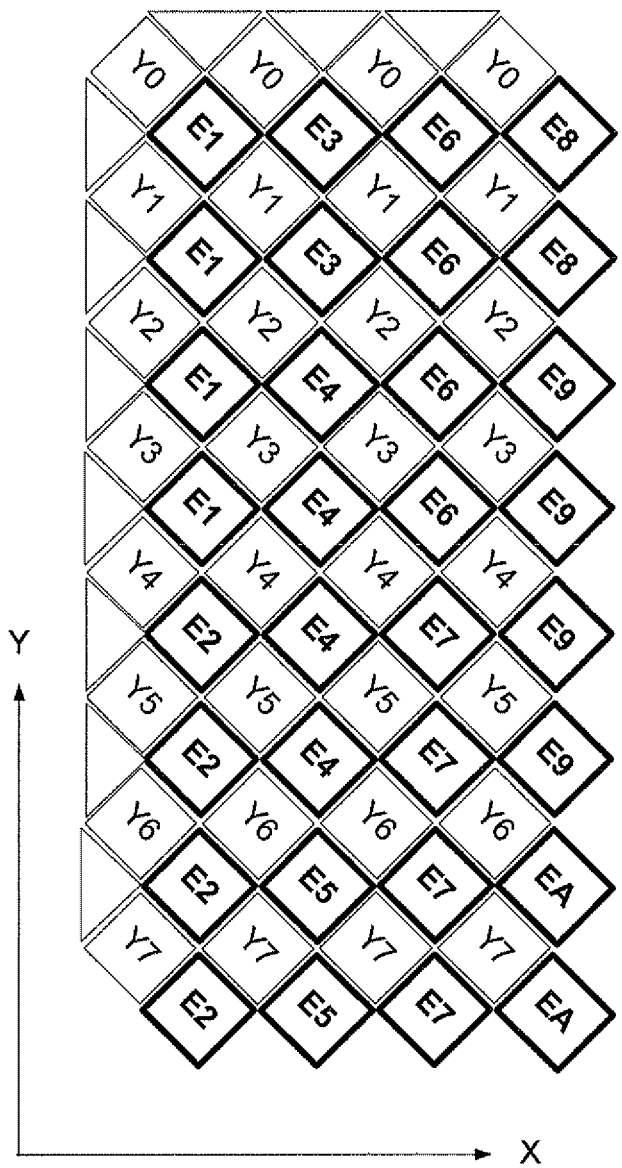
FIG. 11a is an example layout useful in describing the method of FIG. 11c below.

FIG. 11a is an illustration of a "Zipper"-type layout which is now used to describe a method used herein for localizing multiple simultaneous touches. It is appreciated that the method is described with reference to FIG. 11a merely by way of example and the method of FIG. 11a is general enough to apply to a wide variety of layouts including but not limited to all layout options illustrated herein. Also, an essentially infinite number of layout options are possible which include encapsulated diamonds as shown and described generally herein, and the layouts specifically illustrated herein are presented merely by way of example. For example, it is possible to combine various of the layout options shown herein; such as the diagram of FIG. 9a which is a combination of the "zipper" diagram of FIG. 8b and of the "scattered" diagram of FIG. 7a.

In FIG. 11a, each Y surface comprises a horizontal line of diamonds, e.g. the first line of diamonds or any of the lines directly below it. Each E surface comprises a group of vertical diamonds marked with an elliptical shape. A vertical line which supplies the X direction sensing comprises a group of E diamonds. Circles represent the centers of the E diamonds as further described herein below.

The "center" of each (non-truncated) E diamond is defined by the center of mass of its surface shape. However, in the lower and upper sides of the touch panel, there may be some diamonds which are truncated due to touch panels' rectangular topology. For these diamonds, the center is defined as the center of mass of the virtual full diamond shape as if it was not truncated.

Figure 11B:
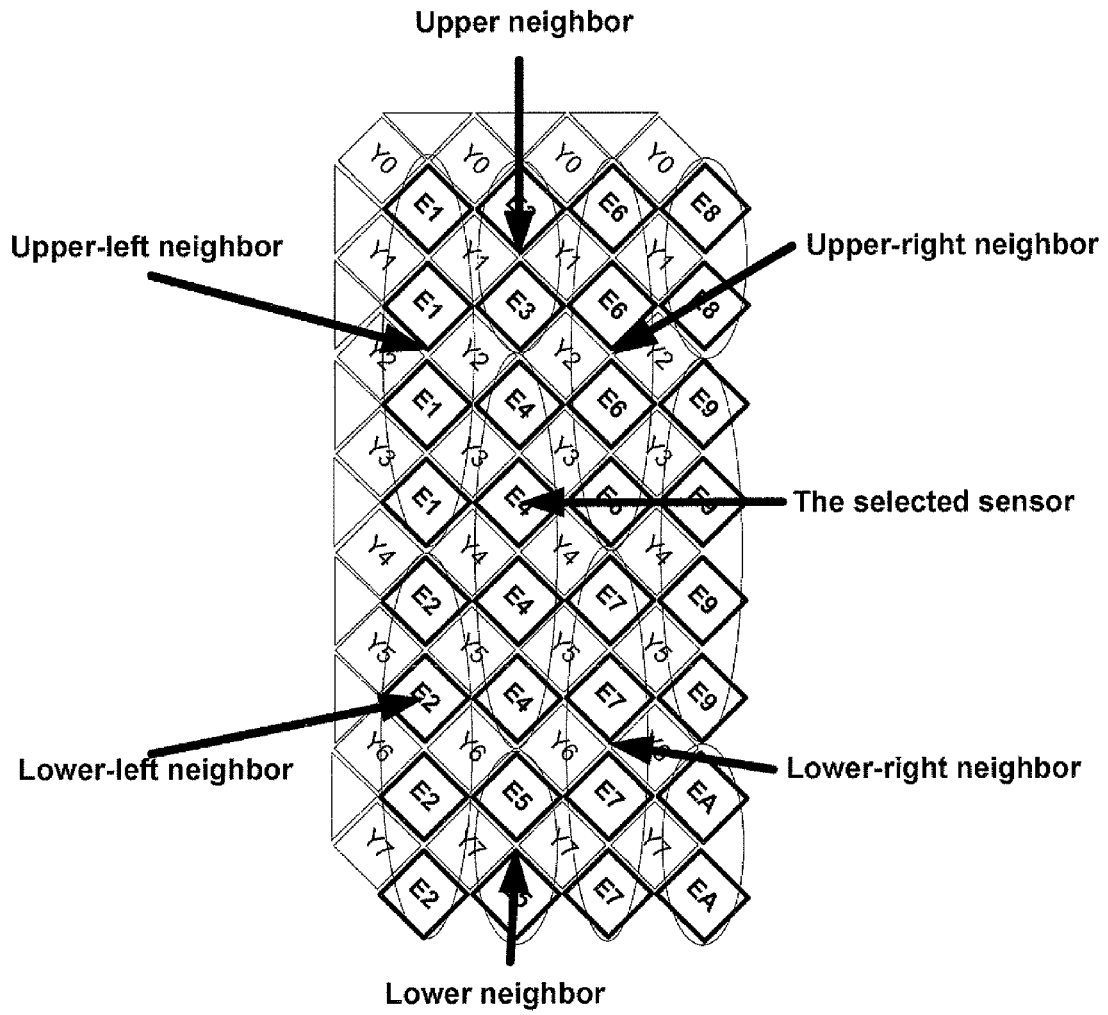
FIG. 11b is a diagram defining neighbors as the term is employed in FIG. 11c below.
Figure 11C:
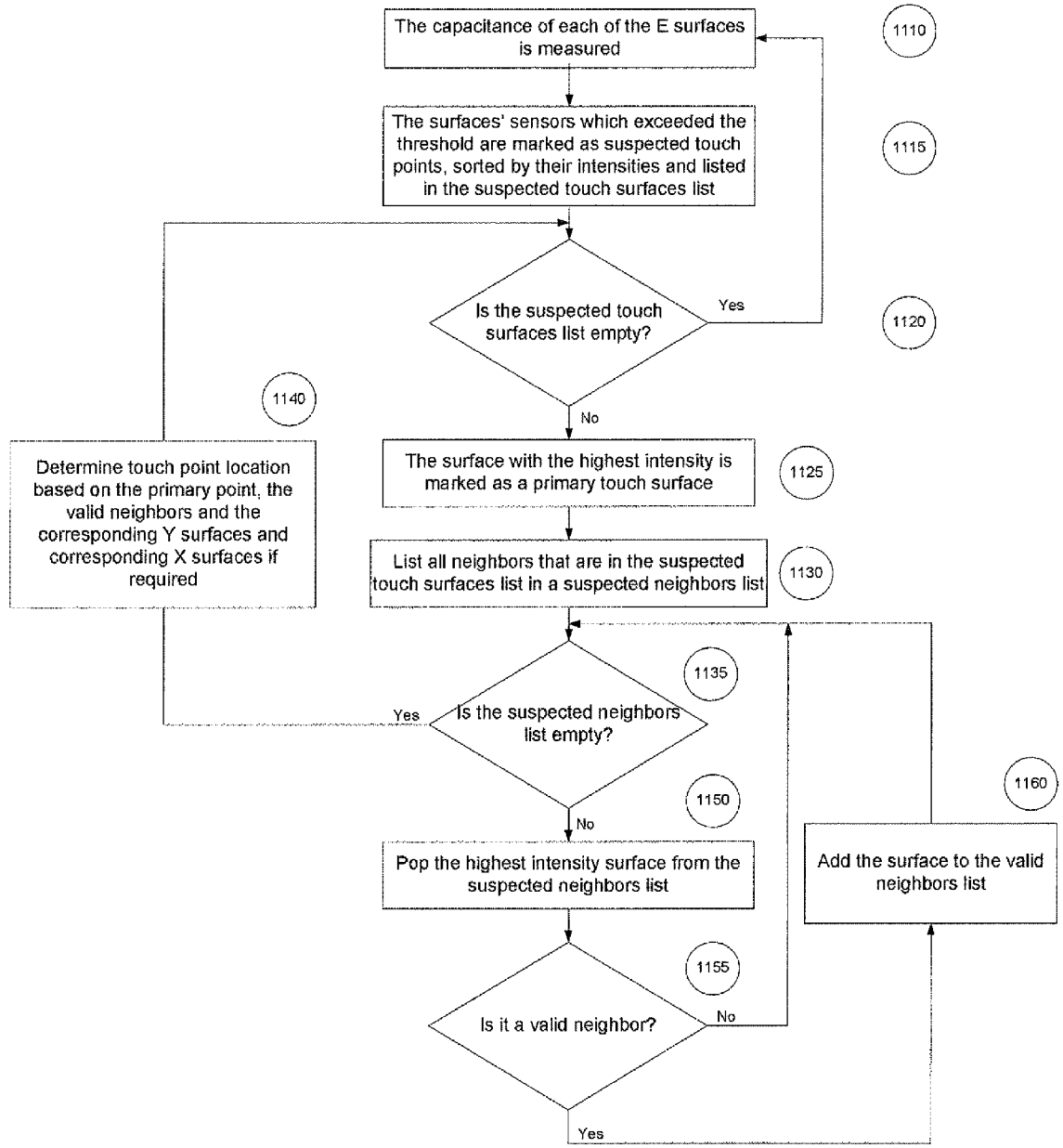
FIG. 11c is a simplified flowchart illustration of an example implementation of a method for localizing multiple touches to a Surface-capacitance-based multi-touch screen apparatus provided in accordance with certain embodiments of the present invention.

The center of mass is typically employed for computing X,Y coordinates of touch points. It is appreciated that each set of E diamonds typically has exactly one set of pre-defined unique coordinates. FIG. 11c is a simplified generally self-explanatory flowchart illustration of a cycle of a method for extracting coordinates of simultaneous multiple touch points which are extracted from a touch panel e.g. that of FIG. 11a or any of those illustrated herein. The method of FIG. 11c typically comprises some or all of the illustrated steps, suitably ordered e.g. as shown. The method of FIG. 11c is typically performed periodically or generally continuously.

In FIG. 11c, the term "Suspected touched surfaces list" refers to a list of E surfaces whose measured capacitance is greater than the conventional touch detection threshold characterizing the touch panel; the threshold may be conventionally determined and typically depends on the particular application and/or used manufacturing materials. According to certain embodiments, this list is inspected until empty, each element in the list being removed after having been inspected.

In step 1140, the location of the primary touch surface marked in step 1125 is determined. The next highest-intensity surface is then analyzed, and so on, until all touches have been localized (or no touches have been found) at which point the method returns to capacitance measuring step 1110.

Any suitable computation may be employed in step 1140. For example, as described above, Coordinates of encapsulated sensors (E1), (E2), Y sensors (Y6), (Y7) and X sensors (X5), (X6) and (X7) are pre-defined (known) by the surface matrix topology. The measured weights (capacitance values e.g.) of the encapsulated sensors, the Y sensors and the X sensors are represented as $[w_1, w_2, \ldots, w_n]$, The touch point X coordinate is computed as a quadratic function (parabola) of three points or as a weighted average (for example) of all X and E sensors, and the Y coordinate is computed from the Y and E sensors in a similar way. Suitable X coordinate computation may for example employ weighted average Formula I above or the quadratic function (parabola) formula II above. After detecting a preliminary or approximate position of the touch point, a more precise computation may be done using another quadratic function (parabola) taking in consideration neighbor X sensors EX−1, EX and EX+1. The coordinate Y is computed using the above quadratic function and weighted average for each touch point.

The term "Primary touch surface" refers to an E surface selected, from the suspected touched surfaces list, to mark a touch point.

The term "Neighboring surfaces" refers to surfaces that reside in proximity to the selected E surface. For example, FIG. 11b illustrates the 6 neighbors of a selected sensor. More generally, each E surface has at most 6 neighboring surfaces: Upper, Upper-left, Upper-right, Lower-left, Lower-right and Lower, as shown in FIG. 11b.

The term "Valid neighboring surfaces list" refers to a list of neighboring surfaces which is "valid" i.e. which influences a touch position discovered by a primary touch surface. A neighboring surface is typically deemed a valid neighbor (step 1155 of FIG. 11c) if:
1. It is present in the "suspected touched surfaces list"
2. Its addition to the valid neighbors list will not violate the following criteria:
    a. Upper neighbor cannot be included in the same set with Lower, Lower-right or Lower-left neighbor
    b. Lower neighbor cannot be included in the same set with Upper, Upper-right or Upper-left neighbor.

It is appreciated that the method of FIG. 11c is just one possible implementation of the more general method of FIG. 11d in which E sensors (capacitive sensors measuring E diamonds) are scanned, those sensors which have been triggered by one or more touch points are identified, the approximate location/s of the touch point's is/are computed based on the locations of e.g. x,y coordinates of the triggered E sensor's diamond/s and, typically, at least one E sensor associated with at least one E-diamond which is a neighbor of the triggered E sensor's diamond/s, and fine-tuning the approximate location/s to obtain exact locations, using information from x-sensors and y-sensors triggered by the touch point, e.g. as described above with reference to Formulae I and II.

Figure 12A:
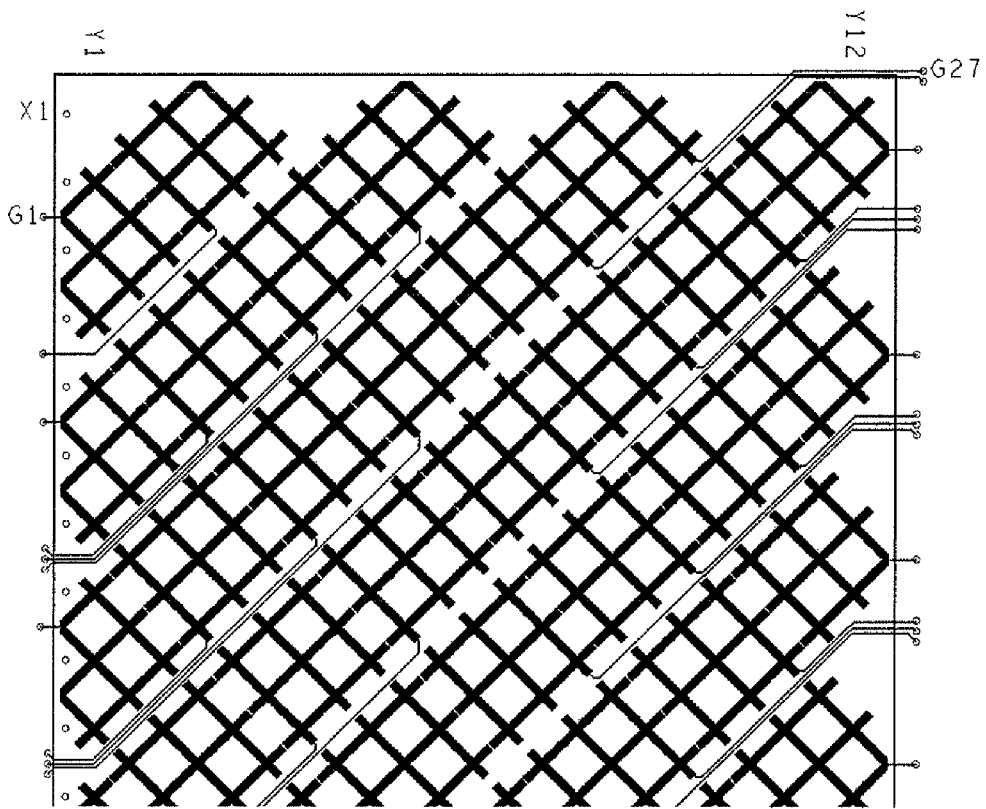
FIG. 12a is an example layout of the "griller" embodiment of FIGS. 7e-7f, showing the layer of FIG. 7f.

FIG. 12a is an example board layout diagram for the "griller" embodiment of FIGS. 7e-7f.

Figure 12B:
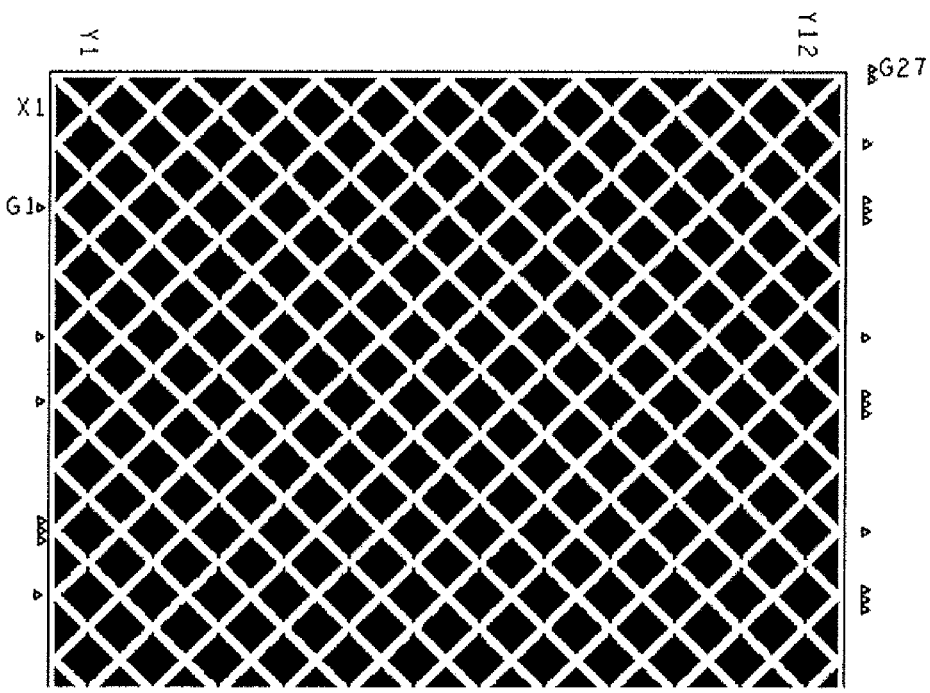

FIG. 12b is the top layer of the example board layout diagram of FIG. 12a.

In certain applications, the area of a finger capable of triggering a diamond beneath it (underlying it) is approximately 10 mm (5 mm for a child).

It is appreciated that terminology such as "mandatory", "required", "need" and "must" refer to implementation choices made within the context of a particular implementation or application described herein for clarity and are not intended to be limiting since in an alternative implementation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program prestored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. Surface-capacitance-based multi-touch touch panel apparatus including:
   a. A touch panel having dimensions L, K respectively along first and second axes respectively and including a multiplicity of electrically conductive shapes, the touch panel including:
      i. At least one row touch surface comprising a subset of said multiplicity of shapes arranged in a row along said first axis wherein all shapes in said subset are connected to a row-specific capacitive sensor; and
      ii. A plurality of approximate position indicative touch surfaces, wherein each approximate position indicative touch surface's dimensions along the first and second axes respectively are less than L and K respectively, and wherein said plurality of approximate position indicative touch surfaces are respectively uniquely connected to a respective plurality of approximate position indicative capacitive sensors; and
   b. A response analyzer operative to identify an approximate location of each touch along both of said axes, based on at least one response obtained from at least one of said approximate position indicative touch surfaces, to refine at least one component, along at least one of said first and second axes, of said approximate location using at least one response obtained from said at least one row touch surface, and to output a refined location for said touch along both of said axes, accordingly.

2. Apparatus according to claim 1 wherein said multiplicity of shapes are spaced, thereby to define boundary areas between adjacent ones of said multiplicity of shapes and wherein said approximate position indicative touch surface covers at least some of said boundary areas.

3. Apparatus according to claim 1 wherein each approximate position indicative touch surface, corresponding to a respective one of the plurality of approximate position indicative capacitive sensors, includes a subset of the multiplicity of electrically conductive shapes and wherein all shapes in said subset and only the shapes in said subset, are connected to said respective one of the plurality of approximate position indicative capacitive sensors.

4. Apparatus according to claim 1 wherein said approximate position indicative touch surfaces are distributed such that any touch of said touch panel changes the capacitance of at least one of said approximate position indicative touch surfaces.

5. Apparatus according to claim 1 wherein no shapes outside of said row are connected to said row-specific capacitive sensor.

6. Apparatus according to claim 1 and also comprising at least one column touch surface comprising a subset of said multiplicity of shapes arranged in a column along said second axis wherein all shapes in said subset are connected to a column-specific capacitive sensor; and wherein said response analyzer is operative to refine both components, along both of said first and second axes, of said approximate location using at least one response obtained from said at least one row touch surface and at least one response obtained from said at least one column touch surface, and to output a refined location for said touch along both of said axes, accordingly.

7. Apparatus according to claim 1 and wherein said at least one row touch surface is interspersed between the plurality of approximate position indicative touch surfaces.

8. Apparatus according to claim 1 wherein each approximate position indicative touch surface includes only that number of shapes which together generate a total touch surface whose dimensions fall within an application-specific resolution defined along at least one of the touch panel's axes.

9. Apparatus according to claim 1 wherein said approximate position indicative touch surfaces are distributed densely enough over said touch panel to ensure that each finger-sized location within the touch panel, when touched by a finger, triggers a group of capacitive sensors to generate a corresponding group of intensities which is unique to the touch panel in that it is not reproduced when any other location within the touch panel is touched.

10. Apparatus according to claim 1 wherein said shapes comprise diamonds.

11. Apparatus according to claim 1 wherein the mean distance between the centers of adjacent approximate position indicative touch surfaces is on the order of one centimeter.

12. A multi-touch method for detecting simultaneous multiple touches of a touch panel, the method including:
    providing a surface-capacitance-based touch panel configured and operative to support multi-touch applications; and
    using the surface-capacitance touch panel to serve a multi-touch application,
    wherein said touch panel serves at least one multi-touch application having an application-specific required resolution and wherein said using includes:
    localizing a touch, along x and y axes, at a resolution less than said application-specific required resolution, thereby to provide approximate x and y touch coordinates; and
    refining said approximate x and y touch coordinates along at least one of said x and y axes to a resolution which satisfies said application-specific required resolution,
    wherein said providing a touch panel comprises providing a touch panel having dimensions L, K respectively along first and second axes respectively and including a multiplicity of electrically conductive shapes, and wherein providing the touch panel includes:
        i. providing at least one row touch surface comprising a subset of said multiplicity of shapes arranged in a row along said first axis wherein all shapes in said subset are connected to a row-specific capacitive sensor, and
        ii. providing a plurality of approximate position indicative touch surfaces, wherein each approximate position indicative touch surface's dimensions along the first and second axes respectively are less than L and K respectively, and wherein said plurality of approximate position indicative touch surfaces are respectively uniquely connected to a respective plurality of approximate position indicative capacitive sensors.

13. A method according to claim 12 wherein said touch panel includes capacitance sensing and wherein a pattern of intensities read from several adjacent sensors is used to accurately position a touch of the touch panel, rather than localizing the touch simply by identifying coordinates of an individual one of the capacitance sensors whose capacitance reading yielded a local maximum intensity.

14. A method according to claim 12 wherein said using comprises:
    scanning approximate position indicative capacitive sensors to identify at least one individual approximate position indicative capacitive sensor triggered by at least one touch,
    computing approximate location of said at least one touch based on a known location of said individual approximate position indicative capacitive sensor; and
    refining said approximate locations to obtain precise locations for said at least one touch, using information from capacitive sensors other than said approximate position indicative capacitive sensors.

15. A method according to claim 14 wherein said computing is also based on a known location of at least one neighboring approximate position indicative capacitive sensor connected to at least one shape which is adjacent to a shape connected to said individual approximate position indicative capacitive sensor.

16. A method according to claim 12 wherein said using comprises:
    identifying an approximate location of each touch along both of said axes, based on at least one response obtained from at least one of said approximate position indicative touch surfaces,
    refining at least one component, along at least one of said first and second axes, of said approximate location using at least one response obtained from said at least one row touch surface, and
    outputting a refined location for said touch along both of said axes, accordingly.

17. A method according to claim 12 wherein said approximate position indicative touch surfaces are distributed such that any touch of said touch panel at least partly touches at least a portion of at least one of said approximate position indicative touch surfaces, hence can be localized.

18. A computer program product, comprising a non-transitory computer usable medium having a non-transitory computer readable program code embodied therein, said non-transitory computer readable program code adapted to be executed to implement a method for:
    detecting simultaneous multiple touches of a touch panel, the method including:
    providing a surface-capacitance-based touch panel configured and operative to support multi-touch applications; and
    using the surface-capacitance touch panel to serve a multi-touch application,
        wherein said providing a touch panel comprises providing a touch panel having dimensions L, K respectively along first and second axes respectively and including a multiplicity of electrically conductive shapes, and wherein providing the touch panel includes:
        i. providing at least one row touch surface comprising a subset of said multiplicity of shapes arranged in a row along said first axis wherein all shapes in said subset are connected to a row-specific capacitive sensor; and
        ii. providing a plurality of approximate position indicative touch surfaces, wherein each approximate position indicative touch surface's dimensions along the first and second axes respectively are less than L and K respectively, and wherein said plurality of approximate position indicative touch surfaces are respectively uniquely connected to a respective plurality of approximate position indicative capacitive sensors.

* * * * *